(12) United States Patent
Gibson et al.

(10) Patent No.: US 11,487,801 B2
(45) Date of Patent: Nov. 1, 2022

(54) DYNAMIC DATA VISUALIZATION FROM FACTUAL STATEMENTS IN TEXT

(71) Applicant: INTERNATIONAL BUSINESS MACHINES CORPORATION, Armonk, NY (US)

(72) Inventors: Stephen D. Gibson, Kemptville (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 16/205,177

(22) Filed: Nov. 29, 2018

(65) Prior Publication Data

US 2020/0175032 A1    Jun. 4, 2020

(51) Int. Cl.
*G06F 16/34* (2019.01)
*G06F 16/25* (2019.01)
*G06F 16/338* (2019.01)

(52) U.S. Cl.
CPC ............ *G06F 16/34* (2019.01); *G06F 16/258* (2019.01); *G06F 16/338* (2019.01)

(58) Field of Classification Search
None
See application file for complete search history.

(56) References Cited

U.S. PATENT DOCUMENTS

| | | | | |
|---|---|---|---|---|
| 8,768,782 B1* | 7/2014 | Myslinski | ............... | G06F 16/95 705/26.1 |
| 9,372,858 B1* | 6/2016 | Vagell | .................. | G06F 40/166 |
| 9,495,341 B1* | 11/2016 | Vagell | .................... | G06Q 10/10 |
| 9,715,556 B2* | 7/2017 | Sekharan | ............... | G06F 16/972 |
| 2004/0122846 A1 | 6/2004 | Chess et al. | | |
| 2012/0317046 A1* | 12/2012 | Myslinski | ............... | G06Q 30/02 705/329 |
| 2014/0164994 A1* | 6/2014 | Myslinski | ............... | G06Q 10/00 715/808 |
| 2014/0320499 A1 | 10/2014 | Hogue et al. | | |
| 2015/0074127 A1 | 3/2015 | Cherwinka et al. | | |
| 2015/0081611 A1* | 3/2015 | Shivakumar | .......... | G06F 40/258 706/46 |

(Continued)

OTHER PUBLICATIONS

Mell et al., "The NIST Definition of Cloud Computing," National Institute of Standards and Technology, Sep. 2011, p. 1-3, Special Publication 800-145.

*Primary Examiner* — Richard L Bowen
(74) *Attorney, Agent, or Firm* — Rakesh Roy

(57) ABSTRACT

A method, computer system, and a computer program product for dynamic data visualization is provided. The present invention may include identifying at least one set of facts in a human-readable text document. They present invention may then include retrieving, from an information source, a dataset associated with the at least one identified set of facts. The present invention may also include, in response to determining that the retrieved dataset includes a fact-supporting dataset, wherein the fact-supporting dataset is configured to validate the at least one identified set of facts, generating at least one data visualization based on the retrieved dataset. The present invention may further include providing the at least one generated data visualization for inserting into the human-readable text document to support the at least one identified set of facts.

17 Claims, 7 Drawing Sheets

(56) References Cited

U.S. PATENT DOCUMENTS

| | | | |
|---|---|---|---|
| 2016/0366080 A1* | 12/2016 | Bastide | H04L 51/12 |
| 2017/0351753 A1* | 12/2017 | Duncker | G06F 16/338 |
| 2019/0114308 A1* | 4/2019 | Hancock | G06F 40/106 |
| 2019/0303772 A1* | 10/2019 | Zhu | G06N 5/046 |
| 2021/0200762 A1* | 7/2021 | Trummer | G06F 40/205 |

* cited by examiner

DYNAMIC DATA VISUALIZATION FROM FACTUAL STATEMENTS IN TEXT

BACKGROUND

The present invention relates generally to the field of computing, and more particularly to data visualization.

Visualizing data is often more compelling than reading a set of facts written within a textual document or presentation. Having a supporting visualization representing the facts included in a presentation or document provides a major benefit to an audience trying to comprehend the underlying facts. However, creating such visualizations is a difficult multi-step process involving finding the proper supporting data and generating the proper data visualization that illustrates the facts communicated by the text.

SUMMARY

Embodiments of the present invention disclose a method, computer system, and a computer program product for dynamic data visualization. The present invention may include identifying at least one set of facts in a human-readable text document. They present invention may then include retrieving, from an information source, a dataset associated with the at least one identified set of facts. The present invention may also include, in response to determining that the retrieved dataset includes a fact-supporting dataset, wherein the fact-supporting dataset is configured to validate the at least one identified set of facts, generating at least one data visualization based on the retrieved dataset. The present invention may further include providing the at least one generated data visualization for inserting into the human-readable text document to support the at least one identified set of facts.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
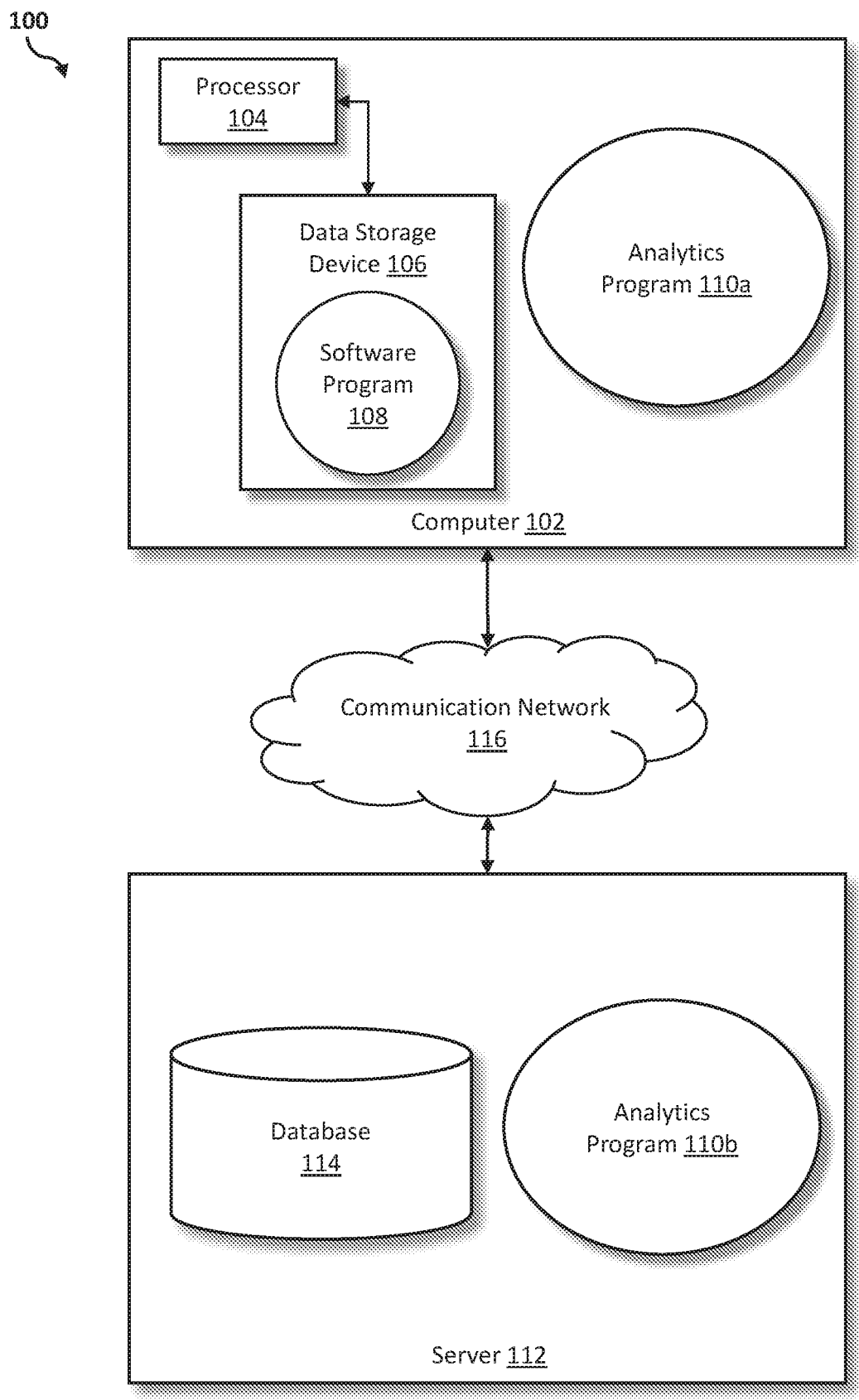
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating dynamic data visualizations from factual statements in written text. As such, the present embodiment has the capacity to improve the technical field of analytics by automatically generating data visualizations that validate and support the factual statements in written text. More specifically, an analytics program may process human-readable text in a document or presentation to identify the facts contained within the text. Then, the analytics program may validate the identified facts against real data retrieved from an information source. Thereafter, a data visualization may be produced and inserted into the document or presentation to support the textual facts based on the real data.

As described previously, visualizing data is often more compelling than reading a set of facts written within a textual document or presentation. Having a supporting visualization representing the facts included in a presentation or document provides a major benefit to an audience trying to comprehend the underlying facts. However, creating such visualizations is a difficult multi-step process involving finding the proper supporting data and generating the proper data visualization that illustrates the facts communicated by the text.

The most common means to solve this problem today is to manually search for data and visualizations using a search engine and manually copy the data visualization into a document or presentation. Some existing technologies can produce visualizations from data based on rules built into a system. However, such existing technologies require the data to be preloaded into the system or application. Some newer tools can create a visualization of data from a natural language processing (NLP) query, but such tools also require the data to be preloaded into the system or application. There are existing NLP technologies that can analyze a text document and link the factual statements to a corpus of consumed data in order to validate and match the factual statements. However, these NLP solutions typically do not work with structured data or present the results as a data visualization. Existing presentation tools provide a way to search for pre-loaded graphics to include in a presentation. However, the pre-loaded graphics are static content that are manually searched for and added to a presentation. Further, some advanced search technologies can generate visualizations from data that is matched to a search term in order to provide a dynamic answer to a question (e.g., when is the busy time for a particular store). However, such search technologies are manually triggered from a search and represent an alternate way to view the data in a search result.

Therefore, it may be advantageous to, among other things, provide a way to generate a data visualization based on facts identified in a text document and insert the generated data visualization into the text document to support the identified facts. It may also be advantageous to provide a way to validate an existing data visualization in the text document against the factual statements within the text document and alert a user (e.g., author) if the existing data visualization does not support the factual statements in the text document. It may further be advantageous to provide a way to validate that the existing data visualization is of a form that best illustrates and supports the factual statements in the text document. It may further be advantageous to provide a way to embed an analytics program into a search engine to enhance the returned textual search results by automatically adding data visualizations generated based on related data sources. Accordingly, an analytics program may enable a user to create more compelling documents and presentations and help the user validate the factual statements in the documents and presentations during the authoring process.

According to at least one embodiment, an analytics program may provide visualization for a set of facts in a text document or validation of an existing visualization for a set of facts in a text document. The analytics program may implement an NLP component to identify facts in a text document and group related facts into a set of facts. The NLP component may be implemented to segment the text document into full sentences and break apart the full sentences to identify any factual statements in the sentences. The NLP component may perform parts-of-speech tagging for a given sentence and store the relevant terms into a language independent data structure. The relevant terms may be mapped to similar results in other sentences even if the sentences include different sentence structures. For example, a sentence, "the car is red." may be broken down into a subject (e.g., car), a verb (e.g., is (be)), and an object (e.g., red). These relevant terms may be mapped or matched to a question "what color is the car?" which may be broken down into a subject (e.g., car), a verb (e.g., is (be)), and an object (e.g., color). The NLP component may group the related sentences based on how closely the relevant terms match, independent of the language of the sentences.

The present embodiment may include a data search component to find datasets that support or conflict with the expressed facts in the document or presentation. The analytics program may implement an internal data search component or an external data search component to search for structured data sets that can support the facts uncovered by the NLP component.

According to at least one embodiment, the analytics program may validate the datasets against the facts uncovered by the NLP component to ensure that the values in the dataset support the uncovered facts. According to another embodiment, the analytics program may implement a visualization engine or component to receive a set of data and produce a compelling visualization for a given intent. The visualization component may insert or replace a visualization to support the uncovered facts in a manner which best visualizes the factual statements in the text document or prompt the user to adjust the factual statements in the case of a conflict with the datasets.

According to one embodiment, the analytics program may execute an NLP system on each sentence in the text document or presentation to identify the sentences that produce facts. The analytics program may then group the factual statements internally, without changing the text in the text document or presentation. The analytics program may group the factual statements by matching the facts based on the NLP footprint (e.g., subject, object, and verb combination) of the sentences that produce the factual statements. For example, factual statements with the same subject, object, verb (and other modifiers) may constitute a group. To loosen the matching, the subject, object, and verb may be related using a distance measure in an ontology, which may need to match a tuned threshold. Then, for each group of facts, the analytics program may search for structured documents that match the group of facts using existing search techniques on the terms found using the NLP. The factual statements from the retrieved structured documents may then be matched against the terms found in the text document using the NLP. In order to perform this matching, the analytics program may convert the structured documents to a format that may be matched to the NLP derived facts. This may be done by matching the context in the data (typically row and column labels) to determine the context of the values in each value cell (e.g., a technique known as tuple shredding). Using such techniques, the value cells in the structured data may be matched to the facts derived from the NLP.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an analytics program 110a. The networked computer environment 100 may also include a server 112 that is enabled to run an analytics program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the analytics program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the analytics program 110a, 110b (respectively) to generate a data visualization based on facts identified in a text document and insert the generated data visualization to support the identified facts in the text document. The data visualization method is explained in more detail below with respect to FIGS. 2-4.

Figure 2:
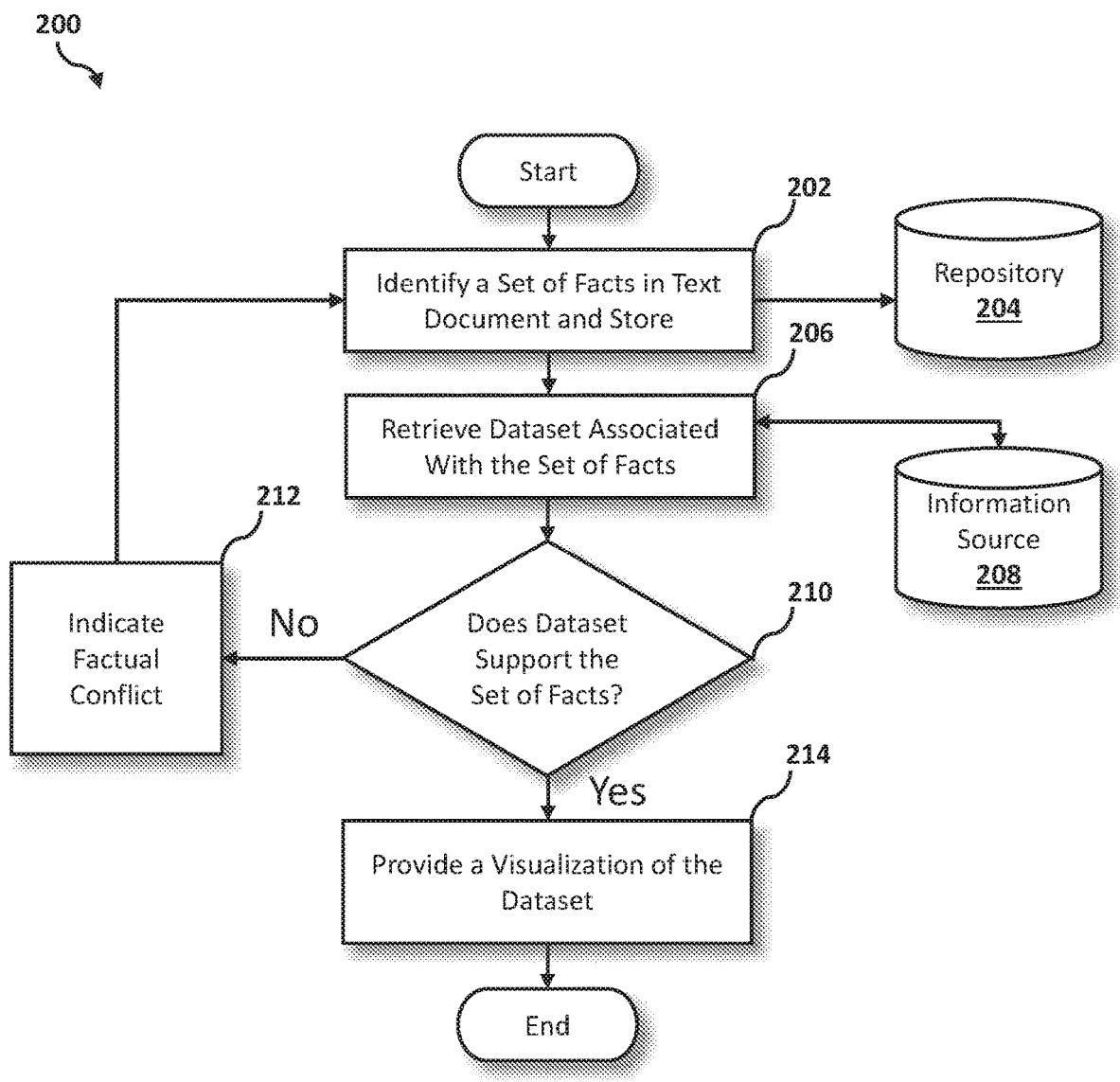
FIG. 2 is an operational flowchart illustrating a process for data visualization according to at least one embodiment.

Referring now to FIG. 2, an operational flowchart illustrating the exemplary data visualization process 200 used by the analytics program 110a, 110b according to at least one embodiment is depicted.

At 202, a set of facts are identified in a text document and stored. The analytics program 110a, 110b running on a user device (e.g., client computer 102) may receive a human-readable text document, such as a word document or a presentation (e.g., social media post, article, e-mail), from a user interacting with the user device. In response, the analytics program 110a, 110b may implement a natural language processing (NLP) component to analyze the unstructured data in the text document in order to identify one or more facts in the human-readable sentences of the text document. Specifically, the NLP component may breakdown or segment the text document into one or more sentences and then may further breakdown or tokenize the individual sentences into separate words or tokens. Thereafter, the NLP component may tag each word or token of a given sentence with a part-of-speech classification (e.g., subject, object, verb, adjective, adverb). In one embodiment, the NLP component may further perform named entity recognition on the tokenized sentence and may tag words or expressions in the tokenized sentence that may indicate an assertion of fact (e.g., names of people and companies, geographic locations, product names, dates, quantities, events).

Using the part-of-speech classifications and the named entity recognition, the NLP component of the analytics program 110a, 110b may identify one or more sentences in the text document that may include facts. Then, the NLP component of the analytics program 110a, 110b may identify one or more fact-relevant terms in the identified sentences that may be associated with the facts included in the sentences. Thereafter, the analytics program 110a, 110b may store the fact-relevant terms in a language independent data structure, such as a repository 204. In one embodiment, the repository 204 may be included locally in the data storage device 106 of the user device (e.g., client computer 102). In another embodiment, the repository 204 may be included remotely in the database 114 of the user device (e.g., server 112) and the analytics program 110a, 110b may transmit the fact-relevant terms, via communication network 116, to the repository 204 for storage.

The analytics program 110a, 110b may map the fact-relevant terms stored in the repository 204 from various sentences in the text document to identify a group or set of facts that may be related. The analytics program 110a, 110b may group the facts into the set of facts based on relating one or more fact-relevant terms included in the set of facts. In one embodiment, the analytics program 110a, 110b may group the set of facts based on the NLP footprint, for example, by matching sentences with the same part-of-speech classifications (e.g., subject, object, verb, adjective, adverb) or named entity recognition tags. In at least one embodiment, the analytics program 110a, 110b may loosen the matching such that sentences with related part-of-speech classifications may be grouped into a set of facts. The analytics program 110a, 110b may determine that the part-of-speech classifications may be related using a distance measure in an ontology. The distance measure may be implemented to match a tuned threshold which may be pre-defined by the analytics program 110a, 110b or user-defined based on an option provided by the analytics program 110a, 110b in a user preference dashboard. The analytics program 110a, 110b may implement the NLP component to group the set of facts internally (e.g., in the repository 204) without changing the textual content in the text document.

For example, the analytics program 110a, 110b running on a user device receives a word document from a user interacting with the user device. The analytics program 110a, 110b implements the NLP component to analyze the text of the word document including, "90% of dentists recommend brand A. Only 10% of dentists recommend brand B. Brand A is better than brand B." The NLP component identifies a first fact including a first fact-relevant terms ("90%," "dentists," "recommend," and "A") and further identifies a second fact including a second fact-relevant terms ("10%," "dentists," "recommend," and "B"). The analytics program 110a, 110b transmits, via communication network 116, the first fact-relevant terms and the second fact-relevant terms from the user device to the repository 204 for storage. The analytics program 110a, 110b implements the NLP component to identify the first fact and the second fact as a set of facts based on the similarities in the NLP footprint of the first fact-relevant terms and the second fact-relevant terms stored in the repository 204.

Then, at 206, a dataset associated with the set of facts is retrieved. The analytics program 110a, 110b may include a data search component internally, or may implement a data search component externally (e.g., via an application programming interface). The analytics program 110a, 110b may implement the data search component to locate a dataset in an information source 208 that may be associated with (e.g., a fact-supporting dataset or a fact-conflicting dataset) the set of facts identified in the text document using the NLP component. In one embodiment, the information source 208 may include an external information source such as the World Wide Web (e.g., website, webpage). The data search component may implement a verification mechanism to ensure the accuracy of the websites or webpages included as an information source for the dataset. In another embodiment, the information source 208 may include an internal or external knowledge database.

The data search component may index unstructured data (e.g., research paper) found in the information source 208 into structured data (e.g., search index) and may then perform a structured data search to query (e.g., via communication network 116) the structured data in the information source 208 for the fact-relevant terms associated with the set of facts. In one embodiment, the data search component may parse through the structured data in the information source 208 in a controlled manner to locate the fact-relevant terms in various fields (e.g., title, author, publication date, content) of the structured data. Thereafter, the data search component may retrieve (e.g., via communication network 116) one or more results (e.g., datasets) from the information source 208 associated with the set of facts identified in the text document using the NLP component.

Continuing with the previous example, the analytics program 110a, 110b implements the data search component to retrieve a dataset from the information source 208 associated with the set of facts identified in the word document using the NLP component. The data search component transmits a query to the information source 208, via communication network 116, to locate the fact-relevant terms "dentists," "recommend," "A," and "B". Specifically, the data search component performs a structured data search in the information source 208 and locates a dataset including "dentist recommendations" in the title and a set of dentist recommendations in the content. Thereafter, the analytics program 110a, 110b implements the data search component to retrieve the dataset from the information source 208 via communication network 116.

Then, at 210, an inquiry is made to determine if the dataset supports the set of facts. The analytics program 110a, 110b may implement the data search component to validate the dataset retrieved from the information source 208 against the set of facts identified in the text document using the NLP component. Specifically, the data search component may analyze the factual statements in the dataset to determine if the dataset matches or supports the set of facts identified in the text document. In one embodiment, the analytics program 110a, 110b may include an error threshold (e.g., +/−2%) and may determine that the dataset supports the set of facts identified in the text document if the dataset is found to be within the error threshold of the set of facts identified in the text document. In at least one embodiment, the error threshold may be program-defined by the analytics program 110a, 110b. In another embodiment, the analytics program 110a, 110b may provide the user with the option to set a user-defined error threshold.

In one embodiment, the data search component may convert the dataset (e.g., documents in extensible markup language (XML) format) retrieved from the information source 208 into a relational format (e.g., relational table) suitable for performing a comparison between the data (e.g., factual statements) in the dataset and the set of facts identified in the text document. In one embodiment, the converted dataset may include a relational table including one or more attributes or columns and one or more tuples or rows. The data search component may analyze the relationship between respective columns and rows (e.g., via matching a respective column with a respective row) to determine the context of the values in each value cell (e.g., tuple shredding). As such, the analytics program 110a, 110b may implement the data search component to compare or match the values in each value cell of the relational table against the set of facts identified in the text document to determine if the factual statements of the dataset supports or validates the set of facts. In one embodiment, the analytics program 110a, 110b may implement the data search component to aggregate each value in the value cells of the relational table (e.g., the dataset) to determine if the dataset supports or validates the set of facts (e.g., a quantity) identified in the text document.

If the analytics program 110a, 110b determines that the dataset does not support the set of facts at 210, then the analytics program 110a, 110b indicates a factual conflict at 212. In one embodiment, the analytics program 110a, 110b may depict a visual indication (e.g., via underlining text, highlighting text, graphical icons) on the text document running on the user device to alert the user to the factual conflict between the factual statements in the dataset retrieved from the information source 208 and the set of facts identified in the text document. In at least one embodiment, the analytics program 110a, 110b may emit an audio indication from the user device to alert the user to the factual conflict. In another embodiment, the analytics program 110a, 110b may provide a prompt (e.g., floating text box) on the text document indicating to the user to adjust the set of facts in the text document to resolve the factual conflict. The analytics program 110a, 110b may provide, in the prompt, the factual statements from the dataset to enable the user to adjust the set of facts in the text document accordingly. Thereafter, the analytics program 110a, 110b may return to 202 of the data visualization process 200 to identify the set of facts in the text document.

Continuing with the previous example, the analytics program 110a, 110b implements the data search component to convert the dataset including dentist recommendations into a relational table, where each row of the relational table indicates a dentist and the column indicates a dentist recommendation for each respective dentist. Thereafter, the data search component aggregates each value in the value cells of the relational table to determine the percentage of dentists that recommend each brand of a product included in the dataset. Based on the aggregation, the data search component determines that the dataset indicates that 90% of dentists recommend brand B and only 10% of dentists recommend brand A. Accordingly, the analytics program 110a, 110b determines that the dataset does not support the set of facts ("90% of dentists recommend brand A. Only 10% of dentists recommend brand B.") identified in the word document. Thereafter, the analytics program 110a, 110b indicates the factual conflict to the user by providing a colored highlighting of the sentences, "90% of dentists recommend brand A. Only 10% of dentists recommend brand B." in the word document. Further, the analytics program 110a, 110b provides a floating text box in the word document including the factual statement ("90% of dentists recommend brand B and only 10% of dentists recommend brand A") determined from the dataset to enable the user to correct the inaccurate statements of the word document.

However, if the analytics program 110a, 110b determines that the dataset does support the set of facts at 210, then the analytics program 110a, 110b provides a visualization of the dataset at 214. The analytics program 110a, 110b may include a visualization engine or component configured to automatically generate a data visualization. The analytics program 110a, 110b may implement the visualization component to receive the dataset as an input, analyze the dataset, and generate a data visualization (e.g., by counting the values in the dataset if the fact modifier is a quantity) that may be optimized for a given intent (e.g., effectively communicating the set of facts in the text document). The data visualizations may include, for example, bar graphs, line graphs, area graphs, pie graphs, or any other suitable types of data visualization. Thereafter, the analytics program 110a, 110b may insert the generated data visualization into the text document. In one embodiment, the analytics program 110a, 110b may generate multiple data visualizations from the dataset and may provide the user with an option (e.g., via a dashboard) to review and select a user-preferred data visualization from the multiple recommendations. In at least one embodiment, the visualization component may prompt the user (e.g., via a text box) to replace a pre-existing data visualization in the text document with the generated data visualization if the visualization component determines that the pre-existing data visualization is not optimized to communicate the set of facts in the text document. In another embodiment, the visualization component may analyze the pre-existing data visualization and may validate that the pre-existing data visualization is of a form that optimally supports the set of facts in the text document.

Continuing with the previous example, based on the aggregation of each value in the value cells of the relational table, the data search component determines that the dataset indicates that 90% of dentists recommend brand A and only 10% of dentists recommend brand B. Accordingly, the analytics program 110a, 110b determines that the dataset validates and supports the set of facts ("90% of dentists recommend brand A. Only 10% of dentists recommend brand B.") identified in the word document. Then, the analytics program 110a, 110b implements the visualization component to automatically generate a data visualization from the dataset. The visualization component determines that the intent of the set of facts in the word document is to compare brand A and brand B of the product. Accordingly, the visualization component generates a bar graph to depict the percentage of dentists that recommend brand A of the product and the percentage of dentists that recommend brand B of the product. Thereafter, the analytics program 110a, 110b inserts the generated bar graph into the word document including the original text.

Figure 3:
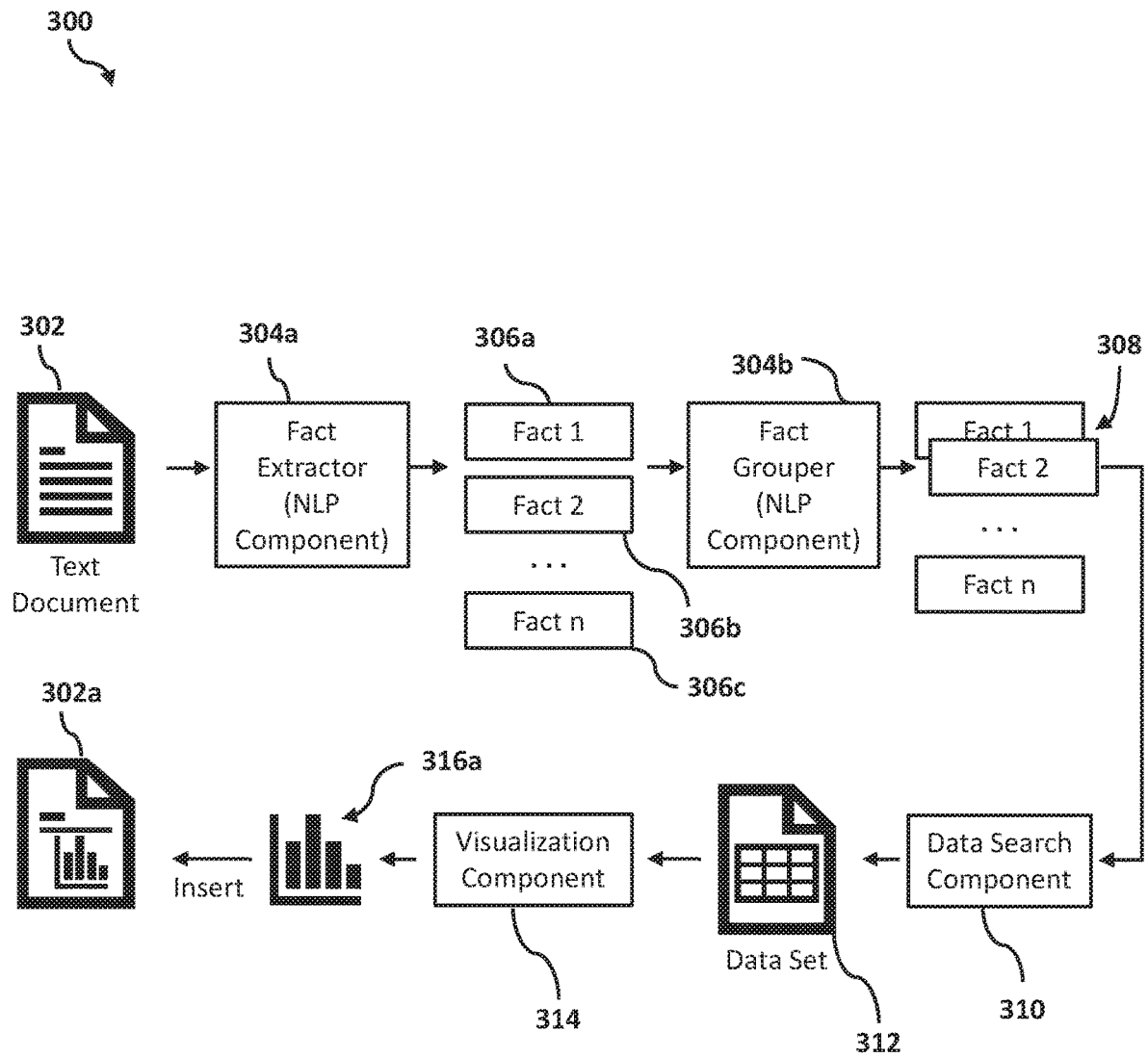
FIG. 3 is a block diagram illustrating an exemplary data visualization process implemented by an analytics program according to at least one embodiment.

Referring now to FIG. 3, a block diagram illustrating an exemplary data visualization process 300 implemented by the analytics program 110a, 110b according to at least one embodiment is depicted.

The analytics program 110a, 110b running on the user device (e.g., client computer 102) receives a text document 302 as previously described at 202. In response, the analytics program 110a, 110b implements the NLP component to analyze the text document 302 in order to identify one or more facts in the sentences of the text document 302 as previously described at 202. Specifically, the analytics program 110a, 110b executes a fact extractor 304a of the NLP component on each sentence of the text document to identify the sentences that include facts. The fact extractor 304a identifies a first fact 306a ("90% of dentists recommend brand A") and a second fact 306b ("10% of dentists recommend brand B") in the text document 302 as previously described at 202. Then, the analytics program 110a, 110b executes a fact grouper 304b of the NLP component to internally group an n number of facts 306c identified in the text document 302, without changing the text of the text document 302. The fact grouper 304b groups the first fact 306a and the second fact 306b into a set of facts 308 based on the similarities in the NLP footprint of the first fact-relevant terms ("90%," "dentists," "recommend," and "A") and the second fact-relevant terms ("10%," "dentists," "recommend," and "B") as previously described at 202. Next, the analytics program 110a, 110b transmits, via communication network 116, the set of facts 308 and the respective fact-relevant terms to the repository 204 for storage, as previously described at 202.

Then, the analytics program 110a, 110b executes a data search component 310 to retrieve a dataset 312 from the information source 208 associated with the set of facts 308, as previously described at 206. Specifically, the data search component 310 queries the information source 208 for the fact-relevant terms ("dentists," "recommend," "A," and "B") associated with the set of facts 308 and performs a structured data search of the information source 208 to locate the dataset 312, as previously described at 206. The data search component 310 locates the dataset 312 including "dentist recommendations" in the title and a set of dentist recommendations in the content. Next, the data search component 310 aggregates the set of dentist recommendations in the dataset 312, as previously described at 210, and determines that the dataset 312 supports that 90% of dentists recommend brand A and 10% of dentists recommend brand B.

After the analytics program 110a, 110b determines that the dataset 312 validates the set of facts 308, the analytics program 110a, 110b implements a visualization component 314 to generate two data visualizations that represent the dataset 312. Thereafter, the analytics program 110a, 110b provides a text document 302a, including a bar graph 316a generated by the visualization component 314, as will be further detailed below with reference to FIG. 4.

Figure 4:
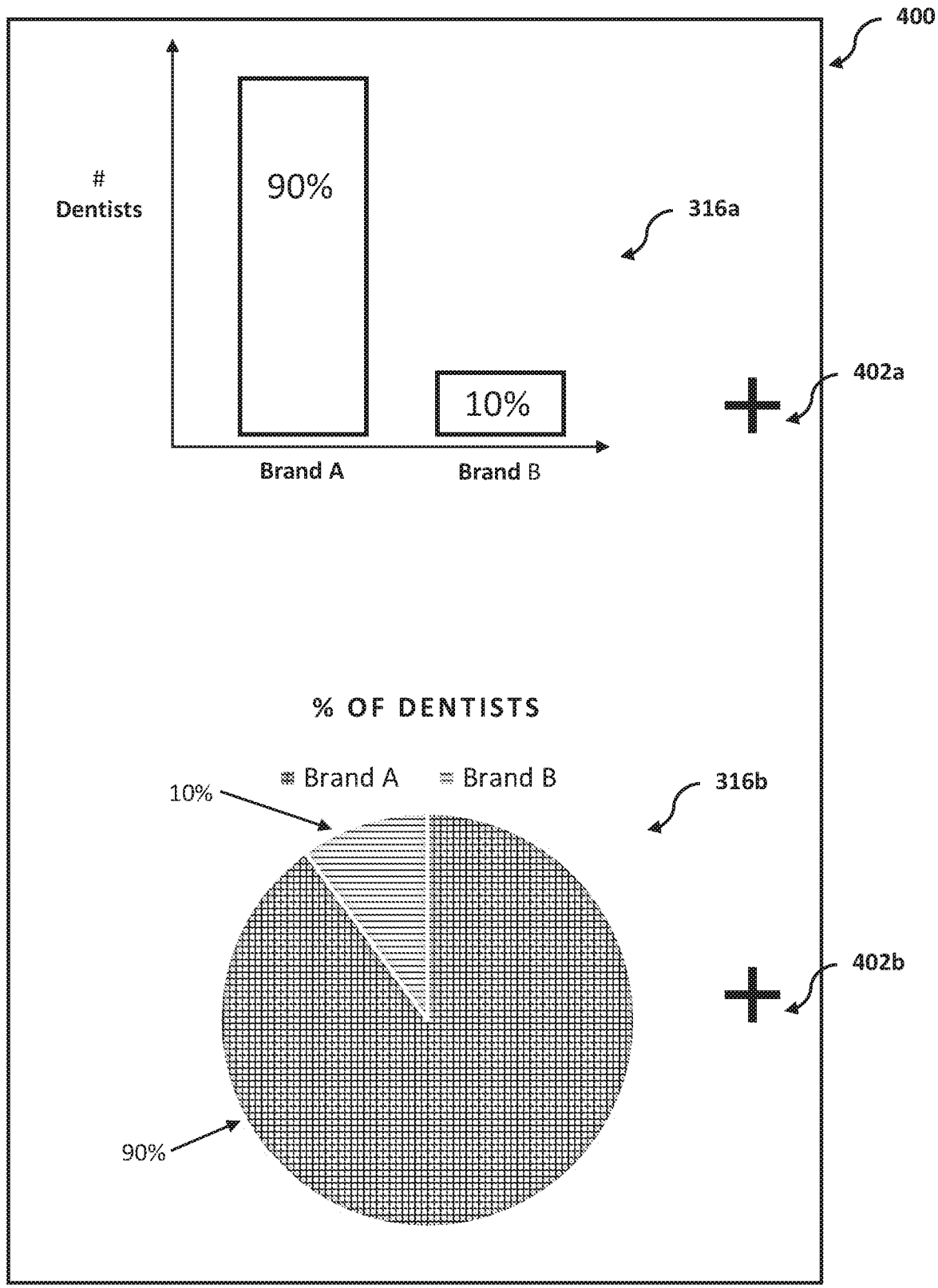
FIG. 4 is a block diagram illustrating an exemplary data visualization dashboard according to at least one embodiment.

Referring now to FIG. 4, an exemplary data visualization dashboard 400 generated using the analytics program 110a, 110b of FIG. 3 according to at least one embodiment is depicted. The visualization component 314 provides the user with a dashboard 400 including a bar graph 316a and a pie graph 316b, both indicating the factual statements of the dataset 312. The dashboard 400 includes a first input button 402a adjacent the bar graph 316a, where selecting the first input button 402a is configured to insert the bar graph 316a into the text document 302. Similarly, the dashboard 400 includes a second input button 402b adjacent the pie graph 316b, where selecting the second input button 402b is configured to insert the pie graph 316b into the text document 302. In response to the user interacting with the user device (e.g., client computer 102) and selecting the first input button 402a, the analytics program 110a, 110b inserts the bar graph 316a into the text document 302 and provides the user with a text document 302a including the original text of the text document 302 and the bar graph 316a.

As described herein, the analytics program 110a, 110b may provide data visualization generated dynamically based on factual statements identified in a human-readable text document. The analytics program 110a, 110b may have the capacity to improve the technical field of analytics by processing the human-readable text document using NLP in order to identify the factual statements included in the text document. Then, the analytics program 110a, 110b may perform a structured data search of the web to locate and retrieve a dataset of real data that may validate the factual statements included in the text document. Thereafter, the analytics program 110a, 110b may automatically generate a data visualization of the retrieved dataset validating the factual statements included in the text document and may provide the generated data visualization in the text document to support the factual statements included in the text document. Thus, the analytics program 110a, 110b may improve the functionality of a computer.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
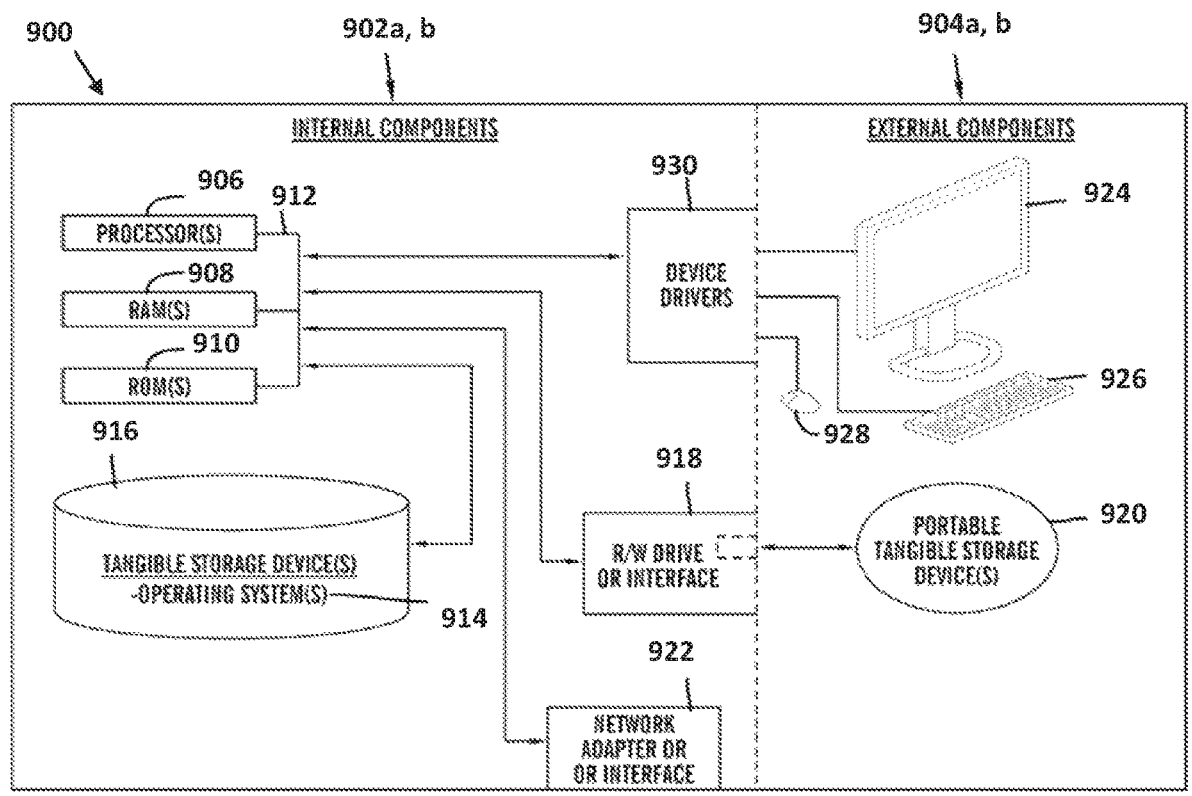
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the analytics program 110a in client computer 102, and the analytics program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the analytics program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the analytics program 110a in client computer 102 and the analytics program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the analytics program 110a in client computer 102 and the analytics program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
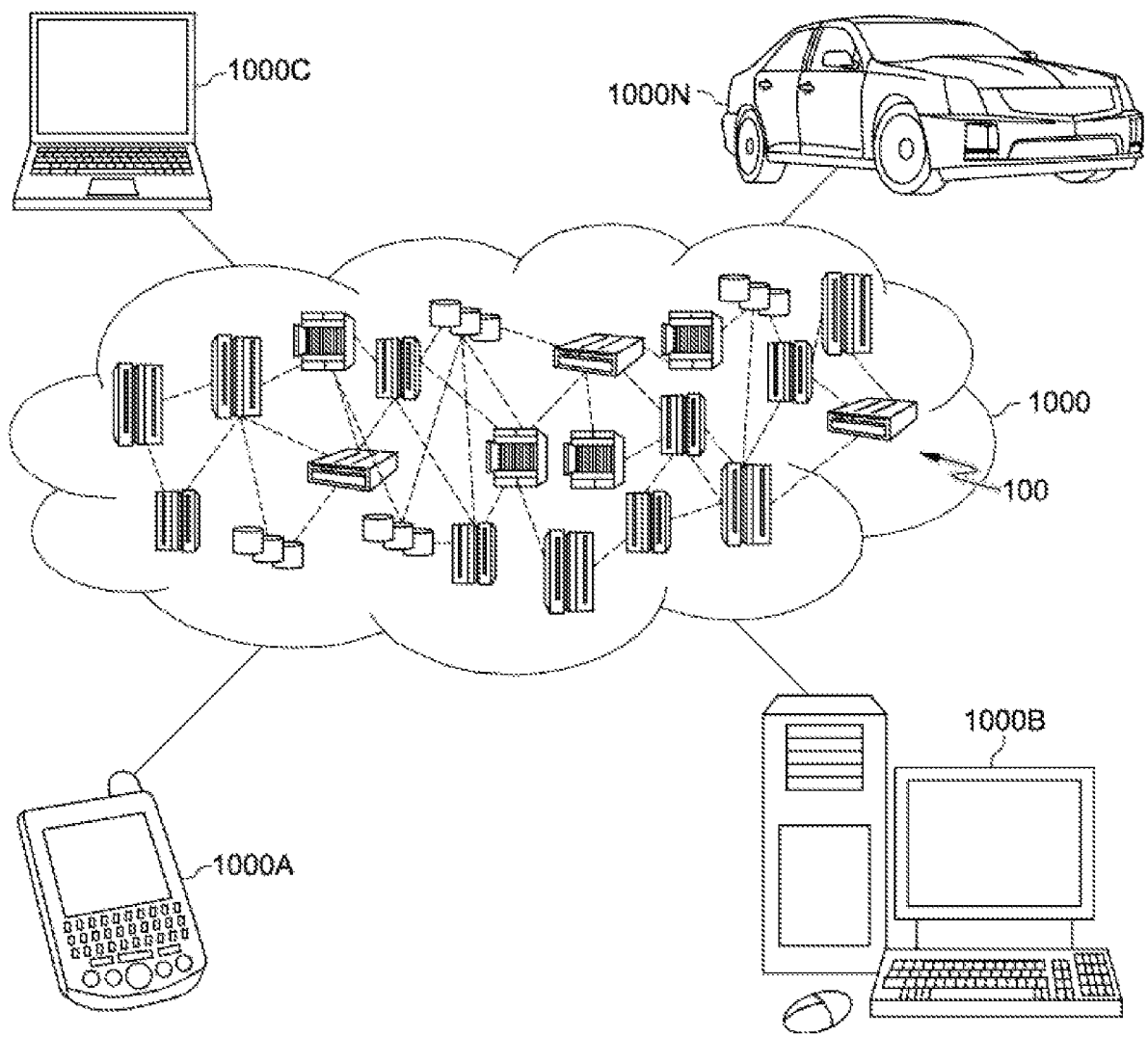
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
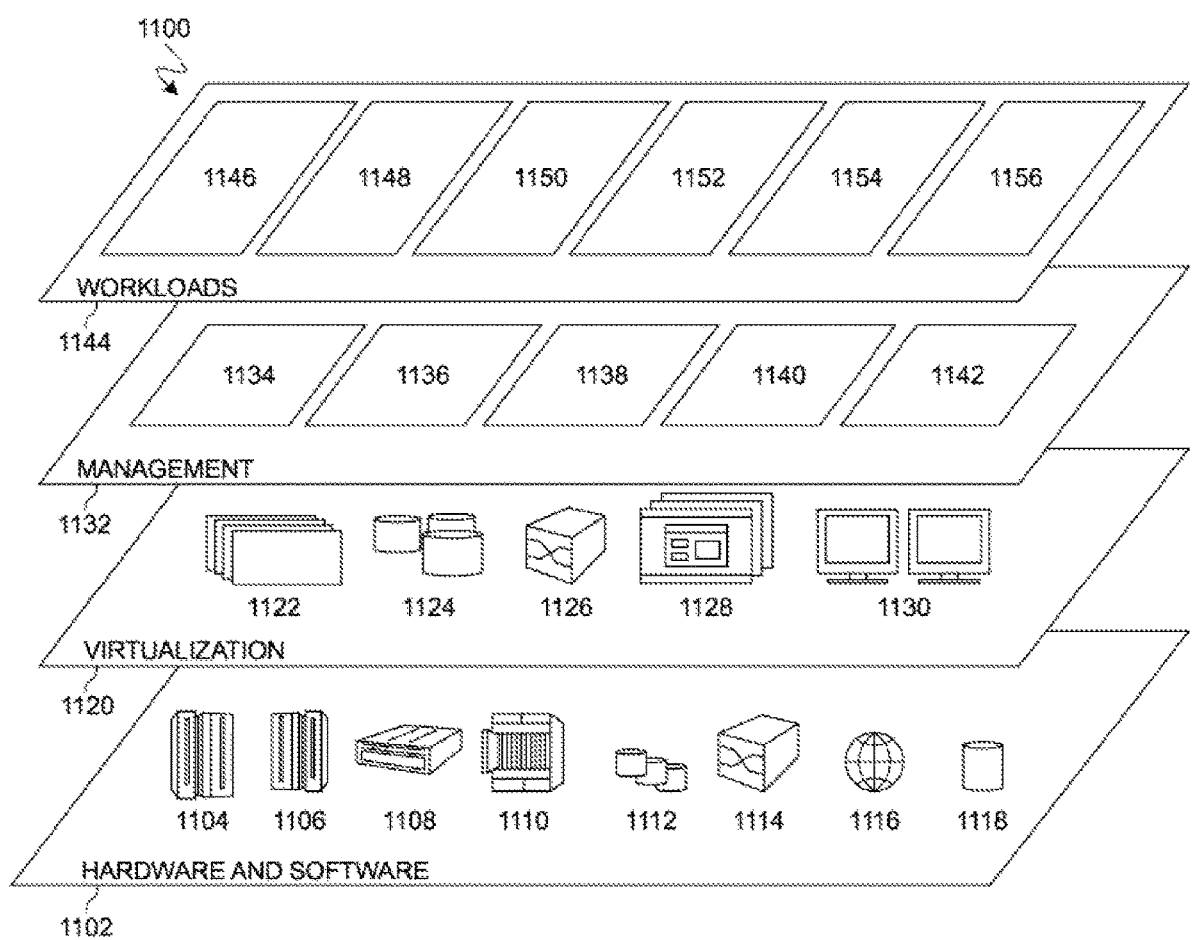
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data visualization 1156. An analytics program 110a, 110b provides a way to dynamically generate a data visualization based on factual statements identified in a human-readable text document.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamic data visualization, the method comprising:

identifying at least one set of facts in a human-readable text document;

retrieving, from an information source, a dataset associated with the at least one identified set of facts;

in response to determining that the retrieved dataset includes a fact-conflicting dataset that conflicts with the at least one identified set of facts, providing, in the human-readable text document, an indication of a factual conflict between the retrieved dataset and the at least one identified set of facts;

in response to determining that the retrieved dataset includes a fact-supporting dataset that validates the at least one identified set of facts, generating at least one graphical data visualization of the fact-supporting dataset, wherein the at least one generated graphical data visualization includes converting an intent of the at least one identified set of facts that is textually described in the human-readable text document into a graphical form; and inserting the at least one generated graphical data visualization of the fact-supporting dataset into the human-readable text document to support the at least one identified set of facts.

2. The method of claim 1, further comprising:
analyzing, using a natural language processing (NLP) component, the human-readable text document to identify a plurality of sentences in the human-readable text document;
identifying, using a fact extractor of the NLP component, a plurality of facts in the plurality of identified sentences;
grouping, using a fact grouper of the NLP component, the plurality of identified facts into the at least one identified set of facts based on relating at least one fact-relevant term included in the at least one identified set of facts; and
storing the at least one identified set of facts into a language independent data structure.

3. The method of claim 1, further comprising:
querying the information source for at least one fact-relevant term associated with the at least one identified set of facts; and
performing a structured data search of the queried information source to locate the retrieved dataset, wherein the retrieved dataset includes the at least one fact-relevant term associated with the at least one identified set of facts.

4. The method of claim 1, further comprising:
converting a plurality of unstructured data in the information source into a plurality of structured data; and
in response to querying the plurality of structured data for at least one fact-relevant term associated with the at least one identified set of facts, locating the retrieved dataset in the plurality of queried structured data.

5. The method of claim 1, further comprising:
converting the retrieved dataset into a relational format, wherein a plurality of data included in the relational format of the converted dataset is configured for performing a comparison against the at least one identified set of facts in the human-readable text document;
determining at least one fact from the plurality of data included in the relational format of the converted dataset; and
in response to comparing the at least one determined fact from the plurality of data included in the relational format of the converted dataset against the at least one identified set of facts in the human-readable text document, validating the at least one identified set of facts in the human-readable text document using the at least one determined fact from the plurality of data.

6. The method of claim 1, further comprising:
identifying a pre-existing data visualization in the human-readable text document; and
in response to determining that the identified pre-existing data visualization is not optimized to communicate the at least one identified set of facts in the human-readable text document, replacing the identified pre-existing data visualization in the human-readable text document with the at least one generated data visualization.

7. A computer system for dynamic data visualization, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
identifying at least one set of facts in a human-readable text document;
retrieving, from an information source, a dataset associated with the at least one identified set of facts;
in response to determining that the retrieved dataset includes a fact-conflicting dataset that conflicts with the at least one identified set of facts, providing, in the human-readable text document, an indication of a factual conflict between the retrieved dataset and the at least one identified set of facts;
in response to determining that the retrieved dataset includes a fact-supporting dataset that validates the at least one identified set of facts, generating at least one graphical data visualization of the fact-supporting dataset, wherein the at least one generated graphical data visualization includes converting an intent of the at least one identified set of facts that is textually described in the human-readable text document into a graphical form; and
inserting the at least one generated graphical data visualization of the fact-supporting dataset into the human-readable text document to support the at least one identified set of facts.

8. The computer system of claim 7, further comprising:
analyzing, using a natural language processing (NLP) component, the human-readable text document to identify a plurality of sentences in the human-readable text document;
identifying, using a fact extractor of the NLP component, a plurality of facts in the plurality of identified sentences;
grouping, using a fact grouper of the NLP component, the plurality of identified facts into the at least one identified set of facts based on relating at least one fact-relevant term included in the at least one identified set of facts; and
storing the at least one identified set of facts into a language independent data structure.

9. The computer system of claim 7, further comprising:
querying the information source for at least one fact-relevant term associated with the at least one identified set of facts; and
performing a structured data search of the queried information source to locate the retrieved dataset, wherein the retrieved dataset includes the at least one fact-relevant term associated with the at least one identified set of facts.

10. The computer system of claim 7, further comprising:
converting a plurality of unstructured data in the information source into a plurality of structured data; and
in response to querying the plurality of structured data for at least one fact-relevant term associated with the at least one identified set of facts, locating the retrieved dataset in the plurality of queried structured data.

11. The computer system of claim 7, further comprising:
converting the retrieved dataset into a relational format, wherein a plurality of data included in the relational format of the converted dataset is configured for performing a comparison against the at least one identified set of facts in the human-readable text document;
determining at least one fact from the plurality of data included in the relational format of the converted dataset; and in response to comparing the at least one determined fact from the plurality of data included in the relational format of the converted dataset against the at least one identified set of facts in the human-readable text document, validating the at least one identified set of facts in the human-readable text document using the at least one determined fact from the plurality of data.

12. The computer system of claim 7, further comprising:

identifying a pre-existing data visualization in the human-readable text document; and in response to determining that the identified pre-existing data visualization is not optimized to communicate the at least one identified set of facts in the human-readable text document, replacing the identified pre-existing data visualization in the human-readable text document with the at least one generated data visualization.

13. A computer program product for dynamic data visualization, comprising:

one or more computer-readable tangible storage media and program instructions stored on at least one of the one or more computer-readable tangible storage media, the program instructions executable by a processor to cause the processor to perform a method comprising:

identifying at least one set of facts in a human-readable text document;

retrieving, from an information source, a dataset associated with the at least one identified set of facts;

in response to determining that the retrieved dataset includes a fact-conflicting dataset that conflicts with the at least one identified set of facts, providing, in the human-readable text document, an indication of a factual conflict between the retrieved dataset and the at least one identified set of facts;

in response to determining that the retrieved dataset includes a fact-supporting dataset that validates the at least one identified set of facts, generating at least one graphical data visualization of the fact-supporting dataset, wherein the at least one generated graphical data visualization includes converting an intent of the at least one identified set of facts that is textually described in the human-readable text document into a graphical form; and inserting the at least one generated graphical data visualization of the fact-supporting dataset into the human-readable text document to support the at least one identified set of facts.

14. The computer program product of claim 13, further comprising:

analyzing, using a natural language processing (NLP) component, the human-readable text document to identify a plurality of sentences in the human-readable text document;

identifying, using a fact extractor of the NLP component, a plurality of facts in the plurality of identified sentences;

grouping, using a fact grouper of the NLP component, the plurality of identified facts into the at least one identified set of facts based on relating at least one fact-relevant term included in the at least one identified set of facts; and storing the at least one identified set of facts into a language independent data structure.

15. The computer program product of claim 13, further comprising:

querying the information source for at least one fact-relevant term associated with the at least one identified set of facts; and performing a structured data search of the queried information source to locate the retrieved dataset, wherein the retrieved dataset includes the at least one fact-relevant term associated with the at least one identified set of facts.

16. The computer program product of claim 13, further comprising:

converting a plurality of unstructured data in the information source into a plurality of structured data; and in response to querying the plurality of structured data for at least one fact-relevant term associated with the at least one identified set of facts, locating the retrieved dataset in the plurality of queried structured data.

17. The computer program product of claim 13, further comprising:

converting the retrieved dataset into a relational format, wherein a plurality of data included in the relational format of the converted dataset is configured for performing a comparison against the at least one identified set of facts in the human-readable text document;

determining at least one fact from the plurality of data included in the relational format of the converted dataset; and in response to comparing the at least one determined fact from the plurality of data included in the relational format of the converted dataset against the at least one identified set of facts in the human-readable text document, validating the at least one identified set of facts in the human-readable text document using the at least one determined fact from the plurality of data.

* * * * *